United States Patent
Büttner et al.

(10) Patent No.: US 10,320,261 B2
(45) Date of Patent: Jun. 11, 2019

(54) ROTOR ALIGNMENT FOR REDUCING VIBRATIONS AND NOISE

(71) Applicant: Siemens Aktiengesellschaft, München (DE)

(72) Inventors: Klaus Büttner, Hollstadt (DE); Klaus Kirchner, Ostheim (DE); Matthias Warmuth, Windshausen (DE); Norbert Wöhner, Heustreu (DE)

(73) Assignee: Siemens Aktiengesellschaft, München (DE)

( * ) Notice: Subject to any disclaimer, the term of this patent is extended or adjusted under 35 U.S.C. 154(b) by 261 days.

(21) Appl. No.: 15/377,117

(22) Filed: Dec. 13, 2016

(65) Prior Publication Data
US 2017/0170703 A1 Jun. 15, 2017

(30) Foreign Application Priority Data
Dec. 14, 2015 (EP) .................................. 15199807

(51) Int. Cl.
| | |
|---|---|
| *H02K 5/15* | (2006.01) |
| *H02K 5/24* | (2006.01) |
| *H02K 7/09* | (2006.01) |
| *H02K 15/16* | (2006.01) |

(52) U.S. Cl.
CPC .............. *H02K 5/15* (2013.01); *H02K 5/24* (2013.01); *H02K 7/09* (2013.01); *H02K 15/165* (2013.01)

(58) Field of Classification Search
CPC .. H02K 5/15; H02K 5/24; H02K 7/09; H02K 15/165; H02K 15/16; H02K 16/00; H02K 15/0006
See application file for complete search history.

(56) References Cited

U.S. PATENT DOCUMENTS

| | | | |
|---|---|---|---|
| 3,039,007 A * | 6/1962 | Williams | ................ F01D 15/10 290/52 |
| 6,794,777 B1 * | 9/2004 | Fradella | ............. F16C 32/0457 310/68 B |
| 7,745,969 B2 | 6/2010 | Lyschick et al. | |
| 7,780,108 B2 | 8/2010 | Lyschick et al. | |
| 8,836,193 B2 | 9/2014 | Büttner et al. | |
| 8,963,394 B2 | 2/2015 | Büttner et al. | |
| 9,154,017 B2 | 10/2015 | Büttner et al. | |
| 9,252,642 B2 | 2/2016 | Büttner et al. | |
| 9,257,883 B2 | 2/2016 | Büttner et al. | |
| 9,281,728 B2 | 3/2016 | Büttner et al. | |

(Continued)

FOREIGN PATENT DOCUMENTS

| | | |
|---|---|---|
| CN | 104863869 A | 8/2015 |
| CN | 204741363 U | 11/2015 |

(Continued)

*Primary Examiner* — Emily P Pham

(74) *Attorney, Agent, or Firm* — Henry M. Feiereisen LLC

(57) ABSTRACT

For reducing vibrations and noise in electrical machines a rotor is mounted in a magnetic alignment device while a bearing shield is loosely held relative to a stator. The rotor is driven by the stator and vibrations of the rotor are detected. A magnetic alignment device is controlled so as to reduce the vibrations. Finally the bearing shield is fixed to the stator in a position determined by the controlling of the magnetic alignment device. Thus electromagnetic forces are taken into consideration during vibration and noise reduction.

10 Claims, 3 Drawing Sheets

(56) References Cited

U.S. PATENT DOCUMENTS

| | | |
|---|---|---|
| 9,287,754 B2 | 3/2016 | Büttner et al. |
| 2003/0164654 A1* | 9/2003 | Thaxton .............. F16C 32/0459 |
| | | 310/90.5 |
| 2007/0096588 A1 | 5/2007 | Kirchner |
| 2008/0197718 A1 | 8/2008 | Wohner |
| 2012/0133236 A1 | 5/2012 | Büttner et al. |
| 2012/0169158 A1 | 7/2012 | Büttner et al. |
| 2013/0187512 A1 | 7/2013 | Büttner et al. |
| 2014/0217840 A1 | 8/2014 | Büttner et al. |
| 2015/0042185 A1 | 2/2015 | Büttner et al. |
| 2015/0207378 A1 | 7/2015 | Büttner et al. |
| 2015/0214810 A1 | 7/2015 | Büttner et al. |
| 2015/0244239 A1 | 8/2015 | Carrasco |
| 2015/0349616 A1 | 12/2015 | Büttner et al. |
| 2015/0372546 A1 | 12/2015 | Büttner et al. |

FOREIGN PATENT DOCUMENTS

| | | |
|---|---|---|
| DE | 19 41 558 A1 | 8/1970 |
| DE | 3742149 A1 | 6/1989 |
| DE | 196 19 997 A1 | 11/1997 |
| DE | 602 10 482 T2 | 12/2006 |
| DE | 10 2010 043 042 A1 | 5/2012 |
| EA | 010752 B1 | 10/2008 |
| JP | 2007181325 A | 7/2007 |
| SU | 1115171 A1 | 9/1984 |

\* cited by examiner

ROTOR ALIGNMENT FOR REDUCING VIBRATIONS AND NOISE

CROSS-REFERENCES TO RELATED APPLICATIONS

This application claims the priority of European Patent Application, Serial No. 15199807.7, filed Dec. 14, 2015, pursuant to 35 U.S.C. 119(a)-(d), the content of which is incorporated herein by reference in its entirety as if fully set forth herein.

BACKGROUND OF THE INVENTION

The invention relates to a method for mounting a rotor in a stator of an electrical machine, and to a mounting system for mounting such a rotor in a stator.

The following discussion of related art is provided to assist the reader in understanding the advantages of the invention, and is not to be construed as an admission that this related art is prior art to this invention.

Electric motors, in particular, in synchronous-reluctance technology, are frequently subjected to vibrations and noise during operation due to asymmetries. Such vibrations and noise are generally disruptive for the intended use, but also for the operating personnel. Therefore, attempts have been made to reduce such vibrations and noise. However, not only electric motors, but in some circumstances, generators are also affected by asymmetries. Here, attempts have also been made to minimize corresponding vibrations and noise, if required.

The causes of these asymmetries firstly result from manufacturing inaccuracies. These include, for example, shape tolerances and positional tolerances of the stator laminations and rotor laminations. Further, inaccuracies may result generally from components such as the housing, stator, bearing shield, bearings and rotor of the electrical machine. In some circumstances, the inaccuracies accumulate, when the rotor is mounted in the stator.

Centering devices are generally used, when mounting a rotor in a stator. A radial fixing of the rotor relative to the stator is carried out thereby. The two components, housing and bearing shields, in this case generally have interference fits on the centering edges. This results in only one fixed position of the rotor relative to the stator.

Asymmetries may also result from the material itself. For example, the magnetic properties of magnetic steel sheet depend on the rolling direction. Significant force-related asymmetries may result, solely, from these minimal magnetic differences during operation of the electrical machine.

The material properties are typically not considered in an ideal alignment of the rotor axis. Motors in synchronous-reluctance technology are generally constructed with a smaller air gap than asynchronous motors. This is because, with a smaller air gap, there is a greater differentiation between the d-axis and q-axis, and also, the efficiency may be increased. At the same time, however, the susceptibility to vibrations, which originate in the electromagnetic system is increased.

It would therefore be desirable and advantageous to address prior art shortcomings and to provide improved rotor alignment in a stator by being able to consider asymmetrical magnetic forces.

SUMMARY OF THE INVENTION

According to one aspect of the invention, a method for mounting a rotor in a stator of an electrical machine includes mounting the rotor in a magnetic alignment device, while a bearing shield, to which at least one rolling bearing for support of the rotor is fastened, is loosely held in relation to the stator, driving the rotor by the stator, detecting first vibrations of the rotor, controlling the magnetic alignment device such as to reduce the first vibrations, and fixing the bearing shield to the stator in a position determined by the controlling of the magnetic alignment device.

Accordingly, an electrical machine is mounted, in which, in subsequent operation, the rotor is mounted by a rolling bearing in/on the stator. The rolling bearing itself is fastened to or in a bearing shield. At the end of the mounting procedure, the bearing shield is then intended to be fixedly fastened to the stator, indirectly, or directly. However, in order to find the correct position, the rotor is initially mounted in a magnetic alignment device, while the bearing shield is still loosely held relative to the stator. Thus, the bearing shield, together with the rolling bearing and the rotor, are radially displaceable. For the alignment, the rotor is now set in rotation, i.e. by the stator, which also exerts corresponding forces on the rotor during operation. Thus, realistic forces, which occur during the operation of the rotor are now present. Vibrations of the rotor related thereto (for example in the form of forces or deflections over time), which result from asymmetrical shapes or effects of force are detected. In response thereto, the magnetic alignment device is controlled so as to reduce the vibrations. The vibrations can even be minimized or eliminated by appropriately controlling the magnetic alignment device. In this state, when the vibrations are reduced, minimized or eliminated, the bearing shield is now fastened to the stator indirectly or directly. Thus, an alignment of the rotor in the stator can be implemented while vibrations and also noise are reduced. Suitably, the rotor is driven during alignment as if driven during normal operation, in particular in terms of the rotational speed.

According to another advantageous feature of the invention, second vibrations of a housing of the electrical machine can be detected, and the magnetic alignment device can be controlled also in response to the second vibrations. Therefore, in addition to the first vibrations, which are detected relative to the rotor, also vibrations relative to the housing are included in the controlling procedure. Similarly, for the controlling procedure, other components of the electrical machine may also be taken into account during the controlling, such as, for example the stator or amounting foot relative to its vibrations.

According to another advantageous feature of the invention, the bearing shield can be fixed to the stator via a housing of the electrical machine. The electrical machine thus has a housing to which the bearing shield is fastened. The housing, in turn, is typically rigidly connected to the stator. As a result, the bearing shield is indirectly fixed to the stator.

According to another advantageous feature of the invention, a centering portion can be mounted to a front face of the housing for displacement in relation to a remaining part of the housing perpendicular to an axis of the rotor, and the centering portion can be fixedly connected to the remaining part of the housing as the bearing shield is fixed to the stator. As a result, an annular centering portion may, for example, be displaceably arranged on the front face of a housing and can then be fixed to the housing, for example by pins, adhesive or by other fastening procedures.

According to another advantageous feature of the invention, a centering portion can be fixedly connected to the front face of the housing, the bearing shield can then be mounted to the centering portion for displacement in a direction perpendicular to the axis of the rotor, and the centering portion can be fixedly connected to the bearing shield as the bearing shield is fixed to the stator. In this case, the centering portion is therefore not displaceable relative to the housing, but the bearing shield is displaceable relative to the centering portion. This may be implemented, for example, by the centering portion having an optionally limited surface on which the bearing shield is movable.

According to another advantageous feature of the invention, a radial displacement of the rotor relative to the stator can be limited to a predetermined maximum value during the controlling of the magnetic alignment device. This is the case, for example, when the axial displacement of the bearing shield or the centering portion is limited by corresponding shoulders on the housing and/or on the centering portion. As a result, the rotor is prevented, for example, from moving toward the stator, when the rotor is aligned in the stator. Thus, it is particularly advantageous, when the rotor is displaceable by less than a predetermined nominal air gap between the rotor and stator in a radial direction.

According to another advantageous feature of the invention, a radial displacement of the rotor relative to the stator can be limited by a predetermined maximum clearance of the bearing shield relative to the housing.

The limit to the displacement in the radial direction may be implemented by a controlling procedure, but also, by a suitable hardware-type embodiment of the components. In particular, the components may have suitable contours, which permit such a maximum clearance, where the rolling bearing is fastened to the housing by the components. As a result, even in the case of an error in the controlling procedure, it is ensured, that the rotor does not come into contact with the stator.

According to another aspect of the invention, a mounting system for mounting a rotor in a stator of an electrical machine includes a magnetic alignment device for mounting the rotor in a rolling bearing, an activation device configured to activate the rotor by the stator, a sensor device configured to detect vibrations of the rotor in an operating state in which the rotor is driven by the stator, and a control device configured to control the magnetic alignment device such as to reduce the vibrations.

In accordance with the present invention, the mounting system can thus have an activation device in addition to the magnetic alignment device. The electrical machine is activated by the activation device for rotating the rotor. Suitably, the activation device is capable to produce such activation signals, as are applied thereto, during normal operation of the electrical machine. A variable activation device is particularly advantageous, by which a plurality of activation signals can be produced for very different types of electrical machine. To realize an exact alignment, the mounting system includes a sensor device by which the vibrations of the rotor of the driven electrical machine can be detected. Advantageously, the sensor device is fixedly connected to the magnetic alignment device. Finally, the mounting system includes a controlling device for controlling the alignment device, with the sensor signal of the sensor device for a control circuit being provided for reducing the vibrations. Therefore, the alignment device (for example an electromagnet), the sensor device (for example a vibration sensor) and the control device (for example a controller), and optionally, a power amplifier, are located in an exemplary control circuit.

According to an advantageous feature of the invention, the alignment device may include a first magnetic bearing device and a second magnetic bearing device, the first magnetic bearing device being mounted radially with one end of a shaft of the rotor, and the second magnetic bearing device being mounted radially with another end of the shaft of the rotor. The shaft of the rotor may therefore be mounted between the two magnetic bearing devices. In this manner, the rotor of the electrical machine can be radially aligned solely by magnetic forces.

According to an advantageous feature of the invention, the first magnetic bearing device can include a magnetic axial bearing. This ensures that the rotor of the electrical machine, when exclusively mounted by the two magnetic bearing devices, is also stabilized in an axial direction.

BRIEF DESCRIPTION OF THE DRAWINGS

Other features and advantages of the present invention will be more readily apparent upon reading the following description of currently preferred exemplified embodiments of the invention with reference to the accompanying drawings, in which.

DETAILED DESCRIPTION OF PREFERRED EMBODIMENTS

Figure 1:
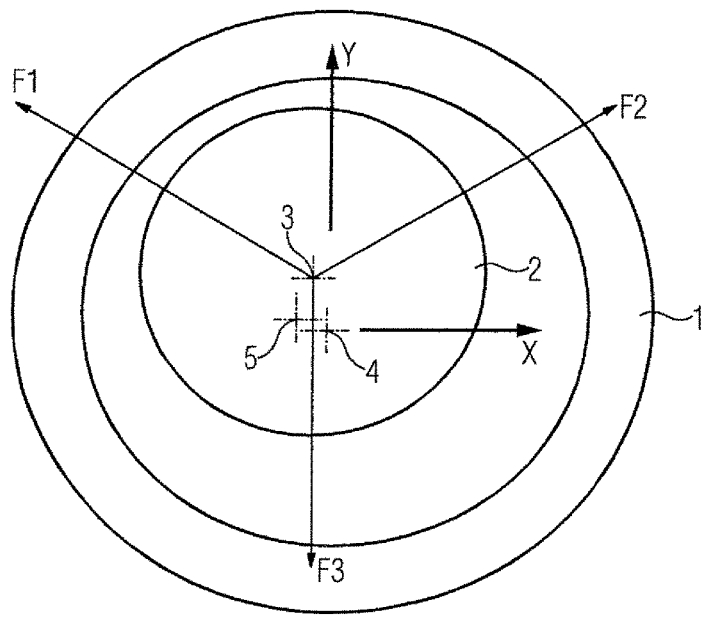
FIG. 1 is a schematic view for representing a radial force distribution in an electrical machine including a rotor and stator.

Throughout the figures, same or corresponding elements may generally be indicated by same reference numerals. These depicted embodiments are to be understood as illustrative of the invention and not as limiting In any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiments described in more detail hereinafter represent preferred embodiments of the present invention. It should be noted that the individual features may be implemented not only in the combinations set forth but also in other technically expedient combinations or separately.

Turning now to the drawing to FIG. 1, there is shown schematically a force distribution in an electrical machine, which includes a stator 1 and a rotor 2. For the sake of simplicity, in this case, the force distribution is only shown in an x-y plane, which extends perpendicular to the axis of the rotor 2. In principle, naturally forces may also be produced in the z-direction, i.e. perpendicular to the x-y plane. These forces, however, are not considered here in a simplified embodiment.

For the sake of manufacturing accuracy, the position of the rotor 2 is determined according to a tolerance chain. The air gap may therefore, fluctuate considerably according to the size of motor. Typically, the air gap in a machine with an axial height of 180 mm may fluctuate up to 0.25 mm. Hitherto, the object was to bring the position of the rotor axis 3, resulting from the manufacturing dimensions, as close as possible, to the ideal geometric rotor axis 4, by the greatest possible manufacturing accuracy. This is associated with a high cost, and depending on how the tolerances coincide, is still subject to a high degree of inaccuracy. In addition, not all affected geometries are able to be considered, such as, for example the bottom of the groove of the stator core. Moreover, the material properties, which become effective inside the magnetic circuit are not considered. These material-specific asymmetries, however, have a significant effect on the excitation. This results, for example, in the three force vectors F1, F2, F3 having variable values starting from the geometric axis 3 and uniformly distributed in the peripheral direction. Therefore, it is the object to reduce, as far as possible, the asymmetries, which result from different forces, in order to reduce additionally the resulting vibrations.

Figure 2:
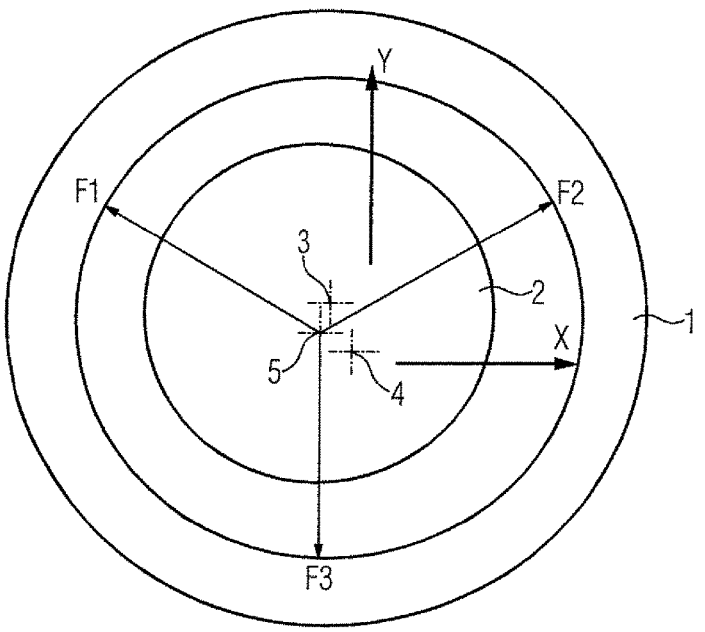
FIG. 2 is a schematic view of the electrical machine of FIG. 1 in a balanced state in terms of force.

To this end, according to FIG. 2, when mounting the rotor, the alignment does not take place according to the resulting manufacturing rotor axis 3 or the ideal geometric rotor axis 4, but also according to an electromagnetically acting rotor axis 5. In this case, when mounting the rotor, the electric machine, for example the motor, is electrically operated, for example by an activation device. The mechanical rotor bearings are not yet fixedly connected to the stator 1. In a practical example, therefore, the bearing shields are not yet fixedly mounted on the housing. By an alignment device, in which, the rotor of the electrical machine is mounted for the mounting, the rotor is aligned in a way, that the forces acting on the rotor cancel one another out, as far as possible. This is the case, for example, when as in FIG. 2, the force vectors F1, F2, F3, which are distributed uniformly over the circumference, and which act on the rotor 2, are of the same length. During the operation of the rotor, therefore, in some circumstances, it is possible to carry out the alignment of the axis of the rotor 2 according to a so-called "electromagnetically acting rotor axis" 5. During such an alignment, this results in a symmetry of the forces, and thus, a reduction in the vibrations, which is as complete as possible for the predetermined operating mode.

Figure 3:
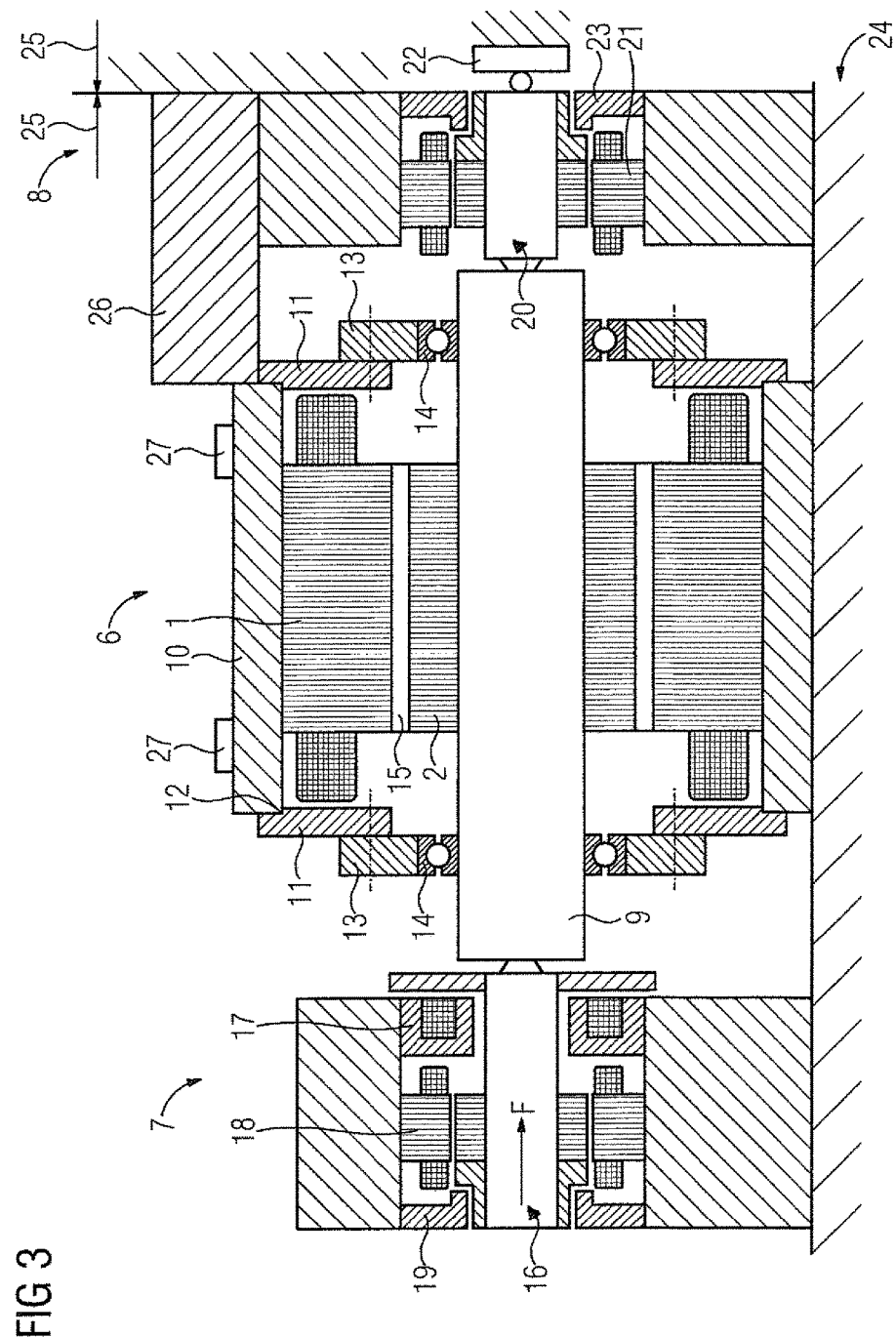
FIG. 3 is a sectional view of an exemplary embodiment of a mounting system according to the invention with incorporated electrical machine.

FIG. 3 shows an exemplary mounting system, an electrical machine, for example a motor 6, being mounted therein. The mounting system, in this case, has two magnetic bearing devices 7 and 8, a shaft 9 of the rotor 2 being mounted therebetween.

In the selected example, the electrical machine and/or the motor 6 has a housing 10, which is fixedly connected to the stator 1. On the front face, the housing 10 has on both sides, one respective centering portion 11, which is of annular configuration. The centering portion 11 has a shoulder 12, by which, it is able to be connected centrally to the remaining housing, in this case, a cylinder casing-shaped housing portion. One respective bearing shield 13, for example, is fastened by pins to each centering portion 11. A bearing 14, which bears the shaft 9, is in turn, fastened to each bearing shield.

Before mounting, for example, according to one embodiment, the bearing shield 13 is not fixedly connected to the centering portion 12. This means that the rotor 2 is not fixedly connected to the stator 1. Instead, the air gap 15 is thus variable.

In the example of FIG. 3, the mounting system includes the two magnetic bearing devices 7 and 8. In a simplified embodiment, however, the mounting system might also have only one magnetic bearing device, and the electrical machine would be initially aligned on one side for the mounting and then reversed and aligned on the other side.

The magnetic bearing device 7, shown to the left in the example of FIG. 3, has a rotor 16, which serves as a receiver for the rotor shaft 9 of the electrical machine and/or of the motor 6. For example, to this end, an axial force F is exerted by the rotor 16 onto the shaft 9. An axial magnetic bearing 17 is suitable, and a disk is thereby fastened directly to the rotor 16. An electromagnet of the axial bearing 17 may, for example, push the disk in the z-direction onto the front face of the shaft 9.

The magnetic bearing device 7 also has a magnetic radial bearing 18, where the rotor 16 is mounted thereby radially. The radial magnetic bearing 18 is, for example, activated by an activation device, so that the rotor 16 together with the shaft 9 during operation of the electrical machine, i.e. during the rotation of the rotor 2, is floatingly mounted. A sensor 19 of the magnetic bearing device 7, in this case, may record vibrations of the rotor 16 of the magnetic bearing device 7, and thus of the rotor 2 of the electrical machine.

The magnetic bearing device 8 is constructed in a similar manner on the right-hand side of the mounting system. It has a rotor 20, which is mounted in a magnetic radial bearing 21. In this case, a variable axial bearing is provided. In the z-direction, i.e. in the axial direction, the rotor is axially fixed by a corresponding support 22. Moreover, the second magnetic bearing device 8 also has a sensor 23 for detecting vibrations of the rotor 20.

The two magnetic bearing devices 7 and 8 are fixed relative to one another, for example, by a mounting 24. This mounting 24 is also able to ensure that the z-axis is fixed, which the arrows 25 indicate. Moreover, a stop 26 may be provided for the axial positioning of the housing 10 of the electrical machine, if it is not sufficiently supported on the mounting 24.

In order to record, not only vibrations of the shaft 9 of the rotor 2, but also those of the housing 10, for example, further vibration sensors may be provided on the electrical machine. For example, one or more vibration sensors 27 are arranged on the housing 10, in order to detect directly, any vibrations of the housing 10.

Before aligning the rotor 2 in the stator 1, therefore, the rotor 2 is not yet fixedly connected to the stator 1. For example, the bearing shield 13 is not yet fixed to the centering device 11 and/or the centering device 11 is not yet fixed to the remaining housing 10. In this state, the rotor 2 is only mounted by the alignment device (in this case the two magnetic bearing devices 7 and 8). For the mounting, the rotor is now operated electrically, and advantageously, as it is also operated in subsequent normal operation. Thus, it is ensured, that as few vibrations as possible, occur during normal operation. The electrical machine is thus activated, for example, at a specific frequency or with a specific signal shape. On the two motor bearings 7 and 8, advantageously, only the radially aligned forces of variable size are optionally detected in all directions (360 degrees). By the alignment device (in this case the magnetic bearing devices 7 and 8), depending on the measured forces, the rotor is displaced in the x-direction and y-direction until the forces acting in all directions are virtually the same size. In a specific embodiment, the vibrations may be detected directly or indirectly by force measurements.

In order to permit a displacement of the rotor axis, therefore, centering devices should not be provided on the bearing shield, or the centering devices are provided on the bearing shield with a degree of freedom in the x-direction and y-direction. As in the example of FIG. 3, the centering portion 11 relative to the bearing shield 13 may represent a planar surface on which the bearing shield is displaceable.

The centering portion 11 is in this case, only centered relative to the remaining housing. The possibility for displacement, however, may be provided both on the bearing shield relative to the housing and on a separate hub component (in FIG. 3 the centering portion 11) on the bearing shield 13.

Advantageously, the extent of the degree of freedom for the displacement of the rotor axis is fixed depending on the desired air gap. Thus, the maximum permitted radial displacement may correspond to a difference between the air gap dimension, minus 0.2 mm. Advantageously, the degree of freedom of the displacement in the centering edge (see shoulders 12) is also less than the air gap of the alignment unit (magnetic bearing). Thus, the rotor may be set in rotation without contact taking place in the alignment unit.

Figure 4:
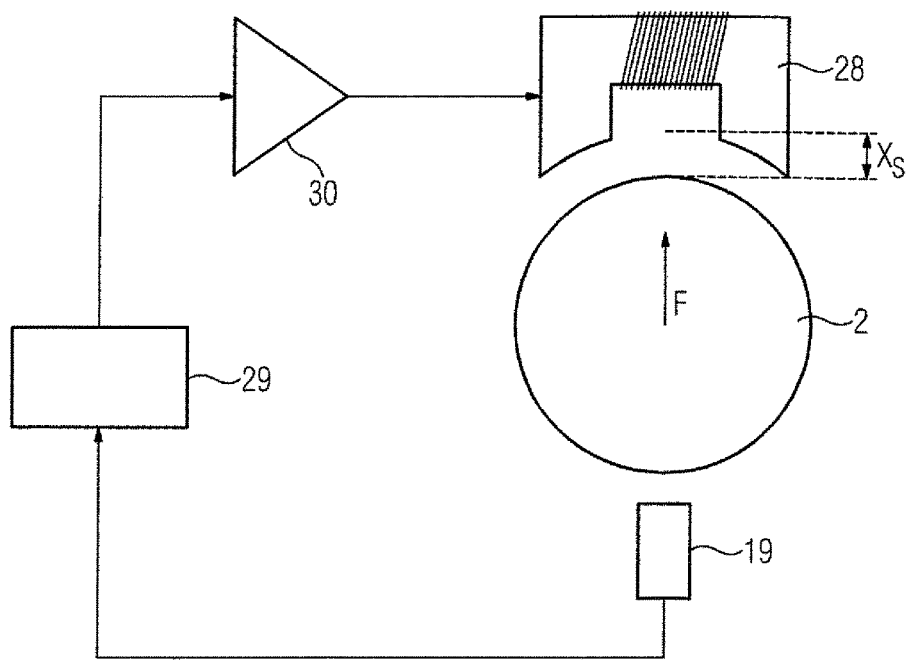
FIG. 4 is a basic sketch of a circuit diagram of a control circuit of a mounting system according to the invention.

For the alignment, the alignment device is controlled by a control device. A corresponding control circuit is shown symbolically in FIG. 4. The alignment device has an electromagnet 28 which acts on the rotor 2. Accordingly, for example, the x-position of the rotor 2 is altered, indicated in FIG. 4 by the distance $x_s$. The electromagnet 28 is, for example, part of the magnetic radial bearing 18. The vibration sensor 19, or alternatively a sensor for the force measurement, records vibrations or forces of the rotor 2 and delivers a corresponding measurement signal to a controller 29. This controller delivers a corresponding control variable, for example via a power amplifier 30, to the electromagnet 28. By such a feedback, an alignment of the rotor is possible, so that vibrations and noise are reduced, and optionally, may even be eliminated. In order to take into account the properties of the housing in the system, the vibration sensors 27 on the housing 10 may be additionally incorporated in the control circuit. Thus, a fine adjustment of the rotor 2 might be possible.

At the end of the alignment procedure, therefore, when the ideal electromagnetic position of the rotor has been established, the bearing shields 13 and/or the centering portions 11 may be fixed to the housing 10 and/or stator 1. Thus, the rotor 2 is in a fixed local position relative to the stator 1. Vibrations and noise of the electrical machine are thus reduced in the designated normal operation.

Advantageously, a smaller air gap may therefore be provided between the rotor and stator, resulting in an increase in efficiency. Moreover, motors may be produced with reduced noise, in particular, in the relatively sensitive reluctance technology field.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for mounting a rotor in a stator of an electrical machine, comprising:
    mounting the rotor in a magnetic alignment device, while a bearing shield, to which at least one rolling bearing for support of the rotor is fastened, is loosely held in relation to the stator;
    driving the rotor by the stator;
    detecting first vibrations of the rotor;
    controlling the magnetic alignment device such as to reduce the first vibrations; and
    fixing the bearing shield to the stator in a position determined by the controlling of the magnetic alignment device.

2. The method of claim 1, further comprising detecting second vibrations of a housing of the electrical machine; and controlling the magnetic alignment device also in response to the second vibrations.

3. The method of claim 1, further comprising fixing the bearing shield to the stator via a housing of the electrical machine.

4. The method of claim 3, further comprising:
    mounting a centering portion to a front face of the housing for displacement in relation to a remaining part of the housing perpendicular to an axis of the rotor; and
    fixedly connecting the centering portion to the remaining part of the housing as the bearing shield is fixed to the stator.

5. The method of claim 3, further comprising:
    fixedly connecting a centering portion to a front face of the housing;
    mounting the bearing shield to the centering portion for displacement in a direction perpendicular to the axis of the rotor; and
    fixedly connecting the centering portion to the bearing shield as the bearing shield is fixed to the stator.

6. The method of claim 1, further comprising limiting a radial displacement of the rotor relative to the stator to a predetermined maximum value during the controlling of the magnetic alignment device.

7. The method of claim 3, further comprising limiting a radial displacement of the rotor relative to the stator by a predetermined maximum clearance of the bearing shield relative to the housing.

8. A mounting system for mounting a rotor in a stator of an electrical machine, comprising:
    a magnetic alignment device for mounting the rotor in a rolling bearing;
    an activation device configured to activate the rotor by the stator;
    a sensor device configured to detect vibrations of the rotor in an operating state in which the rotor is driven by the stator; and
    a control device configured to control the magnetic alignment device such as to reduce the vibrations.

9. The mounting system of claim 8, wherein the magnetic alignment device includes a first magnetic bearing device and a second magnetic bearing device, the first magnetic bearing device being mounted radially with one end of a shaft of the rotor, and the second magnetic bearing device being mounted radially with another end of the shaft of the rotor.

10. The mounting system of claim 9, wherein the first magnetic bearing device includes a magnetic axial bearing.

* * * * *